Figure 1:
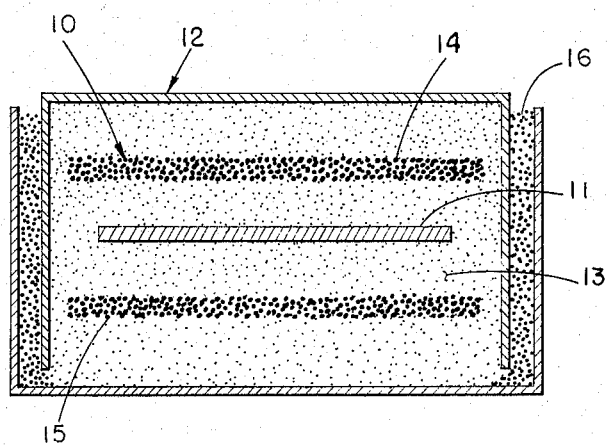

Nov. 22, 1966  W. L. AVES  3,286,684

CEMENTATION COATING PACK

Filed Dec. 24, 1962

WILLIAM L. AVES
INVENTOR.

BY H.C. Goldwire
AGENT

United States Patent Office 3,286,684
Patented Nov. 22, 1966

3,286,684
CEMENTATION COATING PACK
William L. Aves, Arlington, Tex., assignor to Ling-Temco-Vought, Inc., Dallas, Tex., a corporation of Texas
Filed Dec. 24, 1962, Ser. No. 246,718
3 Claims. (Cl. 118—48)

This invention relates to the protective coating of metals and other materials and more particularly to a cementation coating pack.

Because of their high melting points and other desirable characteristics, the refractory metals (including columbium, molybdenum, tantalum, and tungsten and the alloys of which they are the principle component) are of great importance to advances in space travel and in the operation of missiles as well as in many other high-temperature applications such as, for example, heat exchangers, heat shields, certain portions of nuclear-powered aircraft, etc. Unfortunately, all these metals are undesirably susceptible to oxidation at high temperatures and must be provided with a protective coating where they will be exposed to an oxygen-containing environment at elevated temperatures.

To provide the needed protection, use is often made of the process known as pack cementation. The cementation coating pack, contained in a retort, comprises the part or parts to be coated around which is packed a compound of other, powdered substances thoroughly intermixed and including the coating metal or metals (in elemental or combined form), a salt thermally decomposable for forming a carrier gas, and ordinarily an inert filler material. The retort is suitably sealed to provide a suitable carrier gas pressure during processing and is heated to temperatures in the general range of 1800° to 2400° F. As a result, the coating metals are deposited upon and/or diffused into the surfaces of the parts to be coated.

Because both the cementation coating and the refractory metal part on which it is formed tend to be relatively expensive, coating imperfections which necessitate scrappage of the part are costly. Because of their larger areas, imperfections (typified by pinholes) are both more likely to occur and more serious of economic consequence in larger parts (such as wing leading edges, etc.). Attempts are made to touch up these defects but are far from completely satisfactory: the success of a given patch is uncertain and, since they may verge on the microscopic in initial size, many imperfections capable of causing failure of the part in service are apt to go undetected. Many imperfections (such as those in faying surfaces) are inaccessible to either discovery or repair.

Continuous and extensive efforts of course have been made to find and eliminate the causes of pinholes, etc. in cementation coatings. Although thorough intermixing of the pack ingredients, meticulous cleaning of the part to be coated, care in handling the refractory metal part, etc. are of importance in producing a good coating, they have not eliminated defects, which continue to occur in spite of these precautions as well as expedients including electrodeposition, etc. of pre-cementation coatings of chromium, etc. on the refractory metal part. Because they have continued to appear, it has become evident that an important cause of pinholes and related defects in oxidation-resistant, cementation-deposited coatings has eluded the many experts who have sought to eliminate these and similar defects. Many have come to regard these defects as inevitable and have turned their attentions to the provision of materials, in the coating, of high self-healing properties to the end that the defects will be healed in service before the coated part becomes seriously damaged.

It is, accordingly, a major object of the present invention to provide a cementation coating pack by virtue of which an important cause of pinholes and the like defects in cementation coatings is entirely eliminated.

A related object is to reduce greatly the cost of cementation-coated, refractory metal parts by reducing the number of parts which must be reworked or scrapped.

Another object is to improve the high-temperature performance and reliability of refractory metals in the presence of oxygen by providing them with a defect-free, cementation-deposited coating.

A further object is to reduce the attack of a cementation coating process carrier gas upon retort walls.

An additional object is to reduce the cost of the cementation pack materials employed.

A still further object is to reduce sintering in the cementation coating pack and thus to facilitate unloading of the coated part or parts from the retort.

Other objects and advantages will be apparent from the specification and claims and from the accompanying drawing illustrative of embodiments of the invention.

Figure 2:
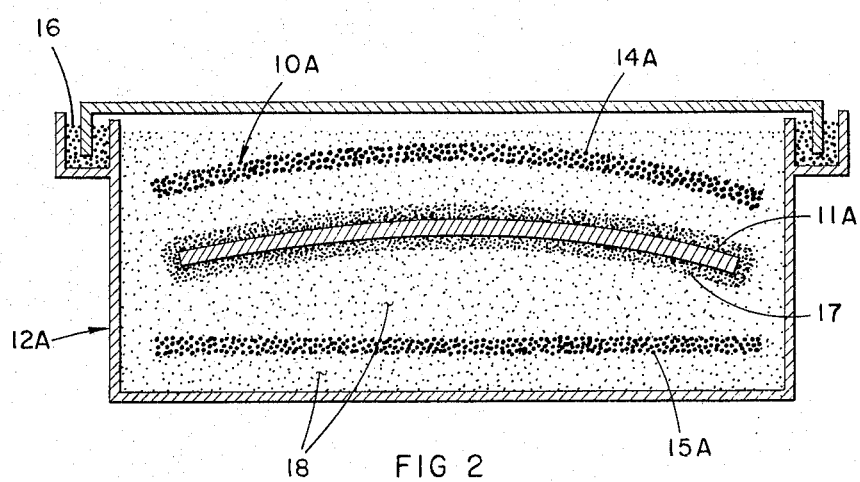
Figure 3:
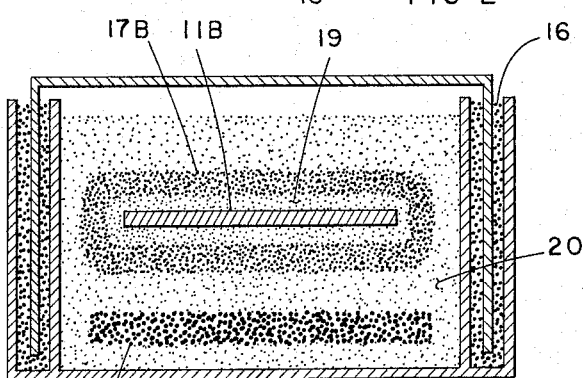

In the drawing:

FIGURE 1 is a schematic, sectional view of a retort provided with a cementation pack according to the invention; and FIGURES 2 and 3 are similar views of modifications of the invention.

Previous cementation packs have employed a salt, for example, a halide, which thermally decomposes when the retort is heated and forms a carrier gas which transports the coating metal or metals to the part to be coated. Especial efforts have been exerted in fine-grinding the salt and thoroughly intermixing it throughout the other, powdered components ordinarily comprising a metal or metals (silicon, chromium, etc) and an inert filler material such as aluminum oxide. The powdered mixture is then packed around the part to be coated, and therein has resided an important and unrecognized source of pinholes and the like defects in the cementation coating: salt particles (probably congregated in groups) in close proximity to the metallic part produce a chemically very active gas at least some of which attacks and reacts with not the metallic powder but the metallic part itself. The region, which may be quite small, where this attack occurs may receive no cementation coating at all; or such coating as it receives may be thin and/or otherwise physically undesirable.

As shown in FIGURE 1, this cause of coating defects is entirely eliminated by segregating the salt 10 from the metallic part 11 to be coated. In practice, a spacing of one-half inch or more of the salt from the part to be coated has proven completely satisfactory, but a much smaller spacing is useable, the main consideration being that the spacing must be large enough to allow the carrier gas to react with the powdered metal before contacting the cementation-treated part. Enclosed in the retort 12, the part is surrounded by, and derives its support from, a material or substances 13, other than the salt 10, which are powdered and contain at least one metal (in elemental or combined form) which is reactive with the carrier gas formed upon thermal decomposition of the salt 10 and depositable therefrom at the part 11. The powdered substances 13 further contain, where desired, an inert material (for example, aluminum oxide). The pack is characterized by segregation of all the salt particles, typically a metal halide, in at least one amassment such as 14 and/or 15 embedded in the powdered material and separated by the latter from the part 11 to be cementation coated. The salt 10, which is spaced also from the walls of the retort 12 and separated from the same by the other, powdered substances 13, need not be fine-ground but may be employed in granulated or crystalline particles of any conveniently obtained size. On the other hand, there is no necessity of the salt 10 being of different particle size from the other material 13, and the salt is shown differently from the other material 13 in the drawing only to distinguish and make clear the locations of the salt layers 14, 15. Since a positive gas pressure is desired during operation of the cementation coating process, the retort is provided with a suitable seal of, for example, sand 16.

Upon heating of the retort, the salt 10 thermally decomposes to yield a gas (for example, a halogen) which in no wise can chemically attack the part 11 to be coated because it is evolved at locations separated by the other powdered material 13 from the part 11. As the gas moves away from the salt amassments 14, 15, it reacts with the metallic portion of the powdered material 13 and is laden with the same by the time that it reaches the metallic part 11, the metal thereupon being deposited on the part 11, i.e., the gas-carried metal is placed on the surface of the part and/or is combined with the material of the part to form a coating. The metal-laden gas does not attack the part 11, and coating defects caused by carrier gas attack thus are entirely obviated. The number of parts which must be scrapped or reworked is much reduced and in fact, as far as concerns the important and previously unrecognized cause of coating defects disclosed herein, effectively becomes zero. Since even microscopic defects occasioned by carrier gas attack of the metallic part 11 are eliminated, a superior coating is produced and the high-temperature performance and reliability of the refractory metal part in an oxygen-bearing environment are much improved.

Still other advantages and benefits accrue to the use of the invention. Since the salt amassments 14, 15 are separated by the part-supporting powdered material 13 from the walls of the retort 12, the latter are less subject to attack by the carrier gas. Further, the pack is less expensive in that there need be expended no labor in fine-grinding and mixing the salt 10. It has been found that pack sintering also is much reduced, thus increasing convenience in removing the coated part 11 from the pack and minimizing the likelihood of its coating being damaged in the process of removal.

In FIGURE 2, the powdered metal or metals are not admixed generally throughout the inert material but are employed only in a layer forming an envelope 17 substantially surrounding and preferably contacting the metallic part 11A to be coated. This powdered material 17 in contact with the part is surrounded by the inert material 18, and it and the salt 10A, for maximum economy, are used only in the quantity actually needed to ensure adequate coating of the part 11A. Packed between the material 17 contacting the part 11A and the walls of the retort 12A, the latter being sealed, for example, by sand 16, the inert material 18 supports the part 11A and has embedded therein the one or more salt amassments 14A, 15A. In this connection, and with reference to all figures of the drawing, the salt is conveniently but not necessarily disposed in a layer or layers; but any shape of the salt amassment is satisfactory where it maintains the necessary segregation of the salt from the part to be coated. Where the pack contains only small parts, only one salt amassment is ordinarily actually required, although a plurality may be employed. Where, as illustrated, a large part is incorporated in the pack, it is preferred to employ at least two amassments, one on each side of the part in order that all surfaces of the part will be amply supplied with the metal-bearing carrier gas. To return to FIGURE 2, the material 17 in contact with the part 11A lies between the part and the salt layers 14A, 15A, thus assuring reaction of the gas with the powdered metal of the material 17 before the gas reaches the part 11A. Actually, the salt layers 14A, 15A are separated from the walls of the retort 12A, the metallic part 11A, and the material 17 in contact with the part 11A by the inert material 18.

Operation of the pack of FIGURE 2 is similar to that of FIGURE 1. Economy is further favored by employing only the amount of salt 10A and powdered metal 17 actually needed, the latter being placed immediately adjacent the part 11A, and the labor of carefully mixing the metallic powder 17 and salt 10A throughout the inert material 18 is saved.

In FIGURE 3, the part 11B to be coated is immediately surrounded and contacted by an amount 19 of a powdered, inert material sufficient to provide a preferably continuous envelope about the part 11B which is, for example, $\frac{1}{32}$ to $\frac{1}{4}$ inch in thickness, a thinner or much thicker envelope being useable with good results. Surrounding this inert material 19, which may be aluminum oxide, is an outer envelope made of a second powdered material 17B, and at least some of this second material is made up of one or more metals reactive with a carrier gas and depositable therefrom on the part 11B to be cementation coated. Between this second powdered material 17B and the retort walls is packed a further quantity 20 of the inert material which has embedded therein at least one amassment 15B of the thermally decomposable salt. In operation, the salt 15B decomposes to yield a gas which passes through the powdered, inert material 20 and through the powdered, metal-containing material 17B, where it forms a gaseous salt of the metal or metals present. This metal-bearing gas passes through the inner envelope 19 of powdered, inert material to the metallic part 11B, on which the metal is deposited from the gas. It has been found that cementation coatings made in this manner are much more uniform in appearance, and chromium coatings, for instance, are brighter. The inner envelope 19 of inert material greatly facilitates post-treatment cleaning of the part 11B, for the inert material is easy to remove from the part and no metal from the outer envelope 17B can stick to or become embedded in the surface of the part 11B.

While only one embodiment of the invention, together with modifications thereof, has been described herein and shown in the accompanying drawing, it will be evident that various further modifications are possible in the arrangement and placement of the pack components without departing from the scope of the invention.

I claim:
1. In combination with a retort having walls, a cementation coating pack comprising:
   at least on emetallic part to be cementation coated and enclosed in the retort;
   a quantity of particles of a salt which upon being heated is thermally decomposable to form a carrier gas;
   powdered material packed around and in contact with the metallic part, at least some of the powdered material being reactive with the carrier gas and depositable therefrom on the metallic part;
   and a powdered, inert material packed between the powdered material in contact with the metallic part and the retort walls,
   all the salt particles being segregated in at least one amassment embedded in the inert material and separated from the metallic part by at least the material in contact with the metallic part, the metallic part being spaced from all the salt particles and free of contact therewith.

2. In combination with a retort having walls, a cementation coating pack comprising:
   at least one metallic part to be cementation coated and enclosed in the retort;
   a quantity of particles of a salt which upon being heated is thermally decomposable to form a carrier gas;
   powdered material packed around and in contact with the metallic part, at least some of the powdered material being reactive with the carrier gas and depositable therefrom on the at least one metallic part;
   and a powdered, inert material packed between the powdered material in contact with the metallic part and the retort walls,
   all the salt particles being segregated in at least one amassment embedded in the inert material and separated by the latter from the retort walls, the metallic part, and the material in contact with the metallic part, the metallic part being spaced from all particles of the salt and free from contact therewith.

3. In combination with a retort having walls, a cementation coating pack comprising:
  at least one metallic part to be cementation coated and enclosed in the retort;
  a quantity of particles of a salt which upon being heated is thermally decomposable to form a carrier gas;
  an amount of a powdered, inert material packed around and in contact with the metallic part and surrounding the same;
  a second powdered material packed around, in contact with, and surrounding the inert material, at least some of the second powdered material being reactive with the carrier gas and depositable therefrom on the at least one metallic part;
  and a further amount of the powdered, inert material packed between the second powdered material and the retort walls,
  all the salt particles being segregated in at least one amassment embedded in the further amount of the inert material, the metallic part being spaced from and free from any contact with the salt.

References Cited by the Examiner

UNITED STATES PATENTS

| | | | |
|---|---|---|---|
| 2,801,187 | 7/1957 | Galmiche | 117—107.2 |
| 3,096,160 | 7/1963 | Puyear. | |

ALFRED L. LEAVITT, *Primary Examiner.*

J. B. SPENCER, MURRAY KATZ, R. S. KENDALL, *Assistant Examiners.*

UNITED STATES PATENT OFFICE
CERTIFICATE OF CORRECTION

Patent No. 3,286,684　　　　　　　　　　　　　　　November 22, 1966

William L. Aves

It is hereby certified that error appears in the above numbered patent requiring correction and that the said Letters Patent should read as corrected below.

Column 4, line 21, before "In" insert -- As before, the inert materials 19, 20 provide support for the part 11 B. --; line 45, for "on emetallic" read -- one metallic --.

Signed and sealed this 12th day of September 1967.

(SEAL)
Attest:

ERNEST W. SWIDER
Attesting Officer

EDWARD J. BRENNER
Commissioner of Patents